United States Patent [19]
Kawauchi

[11] Patent Number: 5,828,993
[45] Date of Patent: Oct. 27, 1998

[54] APPARATUS AND METHOD OF CODING AND DECODING VOCAL SOUND DATA BASED ON PHONEME

[75] Inventor: Masayou Kawauchi, Kamakura, Japan

[73] Assignee: Victor Company of Japan, Ltd., Yokohama, Japan

[21] Appl. No.: 720,160

[22] Filed: Sep. 25, 1996

[30] Foreign Application Priority Data

Sep. 26, 1995 [JP] Japan .................................. 7-271931

[51] Int. Cl.⁶ ...................................................... G10L 9/00
[52] U.S. Cl. ........................... 704/202; 704/201; 704/500
[58] Field of Search ..................................... 704/207, 232, 704/202, 231, 500, 201

[56] References Cited

U.S. PATENT DOCUMENTS

4,811,396  3/1989  Yatsuzuka ................................ 704/230
5,737,716  4/1998  Bergstrom et al. ..................... 704/202

Primary Examiner—David R. Hudspeth
Assistant Examiner—Harold Zintel
Attorney, Agent, or Firm—Jacobson, Price, Holman & Stern, PLLC

[57] ABSTRACT

Sequential digital vocal sound data are orthogonal-transformed per predetermined number of the data to obtain power spectrum data. The power spectrum data are converted into a data conversion form that a feature corresponding to a phoneme of the vocal sound data is extracted. Converted data thus converted into the data conversion form are compared with reference data patterns related to the feature corresponding to the data conversion form to obtain correlation data between the converted data and the reference data. Pitches are extracted in a frequency direction based on the power spectrum data or the converted data. Power values are extracted based on the vocal sound data or the power spectrum data. The correlation data, pitches, and power values are then coded, sequentially. The coded data are decoded and signals related to each phoneme are formed based on the decoded power values and pitches. The signals are synthesizing with each other to reproduce vocal sound signals.

12 Claims, 9 Drawing Sheets

APPARATUS AND METHOD OF CODING AND DECODING VOCAL SOUND DATA BASED ON PHONEME

BACKGROUND OF THE INVENTION

The present invention relates to a vocal sound data coding apparatus and decoding apparatus which can be applied to vocal sound data transmission or file creation for TV conference or AV (audio-visual) data communications. More specifically, this invention relates to coding and/or decoding technique for increasing the data transmission efficiency and decreasing the capacity of storage medium by compressing human vocal sound data at high efficiency and transmitting the compressed vocal sound data.

In the field of audio apparatus, recently, audio data digitizing and processing technique has been developed remarkably. In particular, the digital processing and the data transmission technique of video and audio data are indispensable for various multi-medium apparatus.

With respect to the audio data transmission, conventionally, there exist telephone communications using digital communication lines. In the case of ordinary speech, since the data quantity required to transmit data is relatively small, the capacity of the conventional digital communication line has been so far sufficient. On the contrary, in the case where audio data such as music or movies including vocal sound are required to be transmitted, since a high sound quality is necessary, the capacity of the conventional communication line is not sufficient. This results in a transmission method which sacrifices the real time transmission (e.g., storage forward method) having been so far inevitably adopted.

In general, in order to secure a high sound quality, a data transmission speed as high as about 1.4 Mbps is required, as with the case of CD (compact disk) or DAT (digital audio tape). The transmitted audio data are made up of B sampling clock signal of 40 kHz or more, 16 quantization bits, and two-channel audio data.

Further, in order to store audio data of a high sound quality in a storage medium having a limited capacity, a special high efficiency coding technique as adopted for MD (mini disc) and DCC (digital compact cassette) has been also developed. Even in this case, a transmission speed of 200 to 300 bps (about ¼ to ⅕ of that required for the CD) is necessary.

In any cases, even if the conventional data transmission rate is used or when a somewhat high transmission rate can be achieved, a still higher efficiency coding and/or) decoding technique is required to process or transmit audio data by the multi-medium apparatus or the multi-medium communication method while securing the high sound quality.

Here, as the conventional high efficiency audio data coding technique, the following methods have been so far mainly adopted.

(1) Method of coding orthogonal-transformed signals

In the case where the orthogonal transform (e.g., FFT (fast Fourier transform) or DCT (discrete cosine transform) is executed for audio signals, the transformed audio signals can be decoded to the original signals in accordance with the inverse transform. Therefore, by utilizing the inverse transform, there exists such a method as to code audio signals by assigning codes to audio signals converted into the frequency components thereof. In this method, however, it is impossible to reduce the data quantity in that condition.

Therefore, the coded data quantity has been so far reduced, while securing the auditory sound quality, by assigning the code quantity to the audio signals under due consideration of the fact that the high frequency components are relatively smaller than the low frequency components in the actual audio signals or of the human auditory sense characteristics.

(2) Predictive coding method

In this method, the present sampling values are predicted and estimated on the basis of some past sampled values, and a difference between true value and a predicted value (a predicted error) is coded.

This method reduces data markedly when distortion is permitted to some extent. However, this method is applied to only a field in which a high sound quality is not required as when a simple message is transmitted or when speech is stored by a telephone during a person's absence.

(3) Method of modeling human vocal sound

In this coding method, audio signals are coded based upon human vocal sound, that is, by modeling vocal cords, throat, and nasal cavity shape. This method is now being noticed as a technique which can compress vocal sound in an extremely high efficiency.

As described above, various methods have been so far adopted as the method of compressing audio data. And, in any methods, the basic concept is that audio signals are coded by utilizing signal characteristics in such a way that the signal waveforms or the power spectrum data can be reproduced. In other words, a high efficiency coding is achieved by changing the assignment of the code quantity for each frequency components on the basis of the human auditory sense characteristics or by reducing the data quantity on the basis of the masking effect of the auditory sense.

In the conventional data compression method, audio data are processed per frequency component on the basis of the auditory sense characteristics. In practice, however, sound is not recognized by the human auditory sense per frequency component. Rather, the degree of collection of frequency components gathering in accordance with some regularity is recognized as "sound" by the human auditory sense.

In more detail, when "human vocal sound", "musical instrument sound", "bird song sound" and "water sound" are analyzed, these sounds can be resolved into such a unit as not to be recognized as "a sound" when resolved more (referred to as "phoneme"). That is, in the case of "human speech", each phoneme corresponds to a vowel such as /a/, /i/, etc. or a consonant such as /k/, /c/, etc. In other words, the human auditory sense can recognize "a sound" in unit of phoneme.

Further, each phoneme has a peculiar pattern for each "the degree of collection of frequency components", that is, "the power spectrum distribution and its change rate on time axis" as already explained. The human auditory sense thus can recognize "sound" on the basis of data indicative of change of the peculiar pattern.

In this case, "the power spectrum distribution and its change rate on time axis" of a human voice of /a/, for instance differs according to the speaker; that is, the sound quality differs according to the speaker. A listener can recognize it as a sound belonging to the category of /a/. In this connection, although different according to the theory, the phonemes are roughly classified into vowels and consonants, and the number of vowels is five and the number of consonant is 20 to 40 in the case of Japanese language.

As described above, in the case where audio data are reconsidered from the standpoint of the phonemes, there is room for achieving still higher efficiency coding as compared with when audio signals are coded by assigning coding quantity for each frequency or by utilizing the masking effect of auditory sense. The higher efficiency coding may use a coding method based upon the phoneme with extracting only the data necessary when voice is heard by a listener.

In particular, in the case of human vocal sound, since audio data have been analyzed on the basis of phonemes in the fields of phonetics or voice recognition, it is possible to utilize these search results effectively.

SUMMARY OF THE INVENTION

Accordingly, it is the object of the present invention to provide a vocal sound data high efficiency coding and/or decoding apparatus and methods, by adopting a coding method of extracting audio data necessary from the auditory sense standpoint from among digitalized human vocal sound data on the basis of phonemes.

To achieve the above-mentioned object, the present invention provides an apparatus for coding vocal sound data, comprising: transforming means for orthogonal-transforming sequential digital vocal sound data per predetermined number of the data to obtain power spectrum data; converting means for converting the power spectrum data into a data conversion form that a feature corresponding to a phoneme of the vocal sound data is extracted; comparing means for comparing converted data from the converting means with reference data patterns related to the feature corresponding to the data conversion form to obtain correlation data between the converted data and the reference data; first extracting means for extracting pitches in a frequency direction on the basis of the power spectrum data or the converted data; second extracting means for extracting power values on the basis of the vocal sound data or the power spectrum data; and coding means for sequentially coding the correlation data, pitches, and power values.

Further, the present invention provides an apparatus for decoding vocal sound data, comprising: decoding means for decoding coded data formed at least with pitches, and power values per phoneme related to vocal sound; signal forming means for forming signals related to each phoneme on the basis of the decoded power values and pitches; and synthesizing means for synthesizing the signals with each other to reproduce vocal sound signals.

Further, the present invention provides a method for coding vocal sound data, comprising the steps of: orthogonal-transforming sequential digital vocal sound data per predetermined number of the data to obtain power spectrum data; converting the power spectrum data into a data conversion form that a feature corresponding to a phoneme of the vocal sound data is extracted; comparing converted data thus converted into the data conversion form with reference data patterns related to the feature corresponding to the data conversion form to obtain correlation data between the converted data and the reference data; extracting pitches in a frequency direction on the basis of the power spectrum data or the converted data; acting power values on the basis of the vocal sound data or the power spectrum data; and coding the correlation data, pitches, and power values, sequentially.

Further, the present invention provides a method for decoding vocal sound data, comprising the steps of: decoding coded data formed at least with pitches, and power values per phoneme related to vocal sound; forming signals related to each phoneme on the basis of the decoded power values and pitches; and synthesizing the signals with each other to reproduce vocal sound signals.

DETAILED DESCRIPTION OF THE PREFERRED EMBODIMENTS

The embodiment of the vocal sound data coding apparatus and decoding apparatus according to the present invention will be described hereinbelow with reference to the attached drawings.

Figure 1:
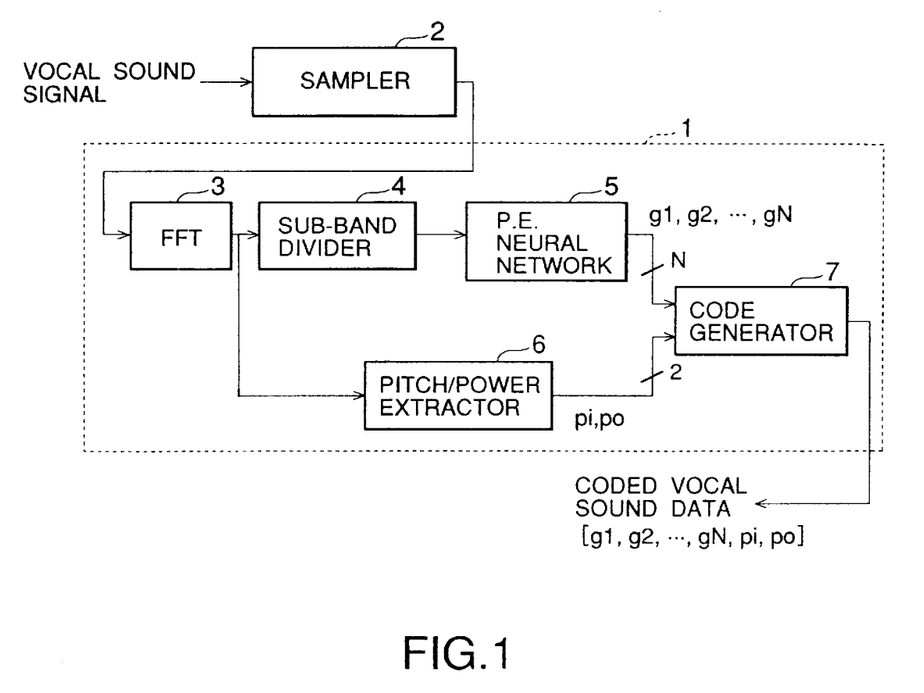
FIG. 1 is a circuit block diagram showing an embodiment of the vocal sound data coding apparatus according to the present invention.

FIG. 1 is a block diagram showing a coding apparatus 1. In the coding apparatus 1, vocal sound signals are regarded as being represented by a linear function on the time axis. Further, input data to the coding apparatus 1 are digital data sampled sequentially and discretely by a sampler 2.

Figure 2A:
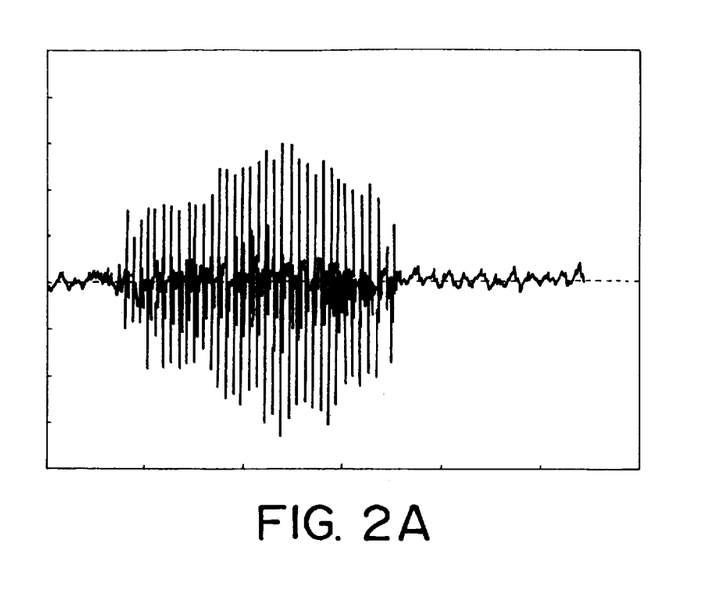
FIGS. 2A and 2B are waveform examples obtained by sampling vocal sound signals.
Figure 2B:
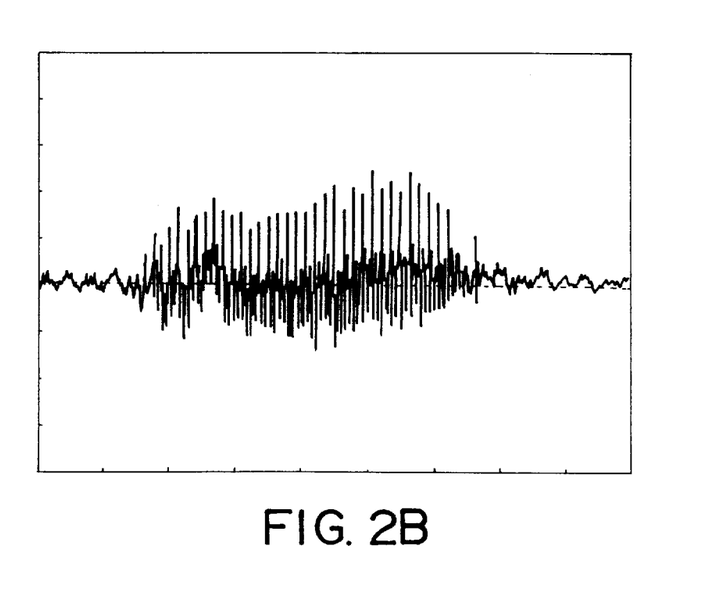

That is, when there exists a vocal sound within a time band, the sampled data as shown in FIGS. 2A and 2B can be obtained according to the continuity and the sound pressure level of its phoneme. On the other hand, when a plurality of sounds are produced at the same time, the sampled data are of course a signal waveform obtained by synthesizing the respective vocal sounds.

Further, in FIG. 1, the vocal sound data digitalized by a sampler 2 are input to the coding apparatus 1. Not only that, previously-filed sampled data may be directly input to the coding apparatus. Further, sampled data via a communication line may be input.

When the vocal sound data are input to the coding apparatus 1, a fast Fourier transformer (FFT) 3 orthogonal-transforms the input data per predetermined number of input data. The FFT 3 then obtains power spectrum data indicative of the frequency component distribution per interval of the predetermined number of input data.

For instance, when the sampling frequency of the sampler 2 is 44.1 kHz, and the number of taps of the FFT 3 is 256, the sampled date processed by the FFT 3 at a time corresponds vocal sound data for about 5.8 msec.

After having been processed by the FFT 3, the power spectrum data are input to a sub-band divider 4, to divider the power spectrum data into sub-bands so as to be adapted to the frequency characteristics of the human auditory sense.

Figure 3:
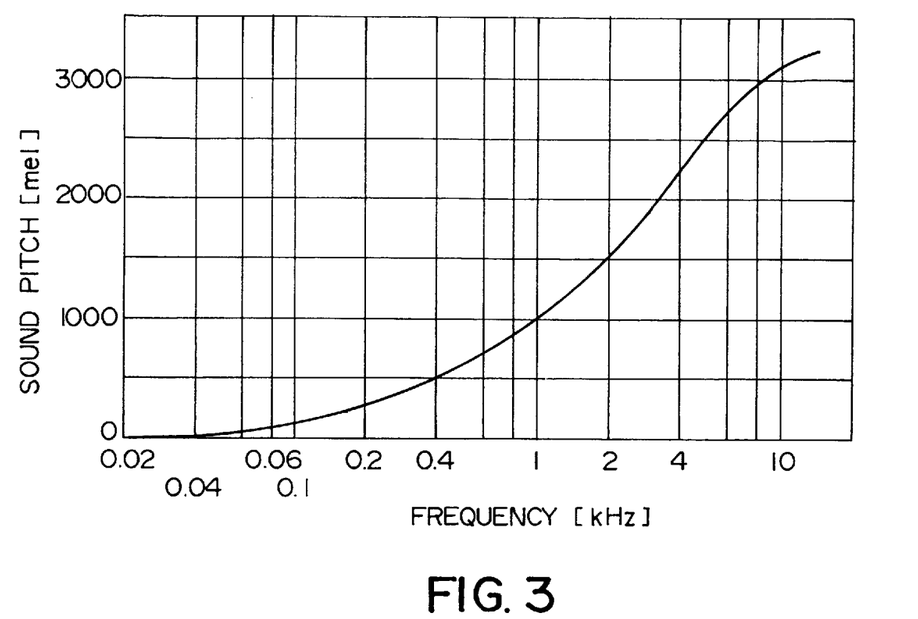
FIG. 3 is a graphical representation showing the relationship between sound frequencies and human auditory sense.
Figure 4:
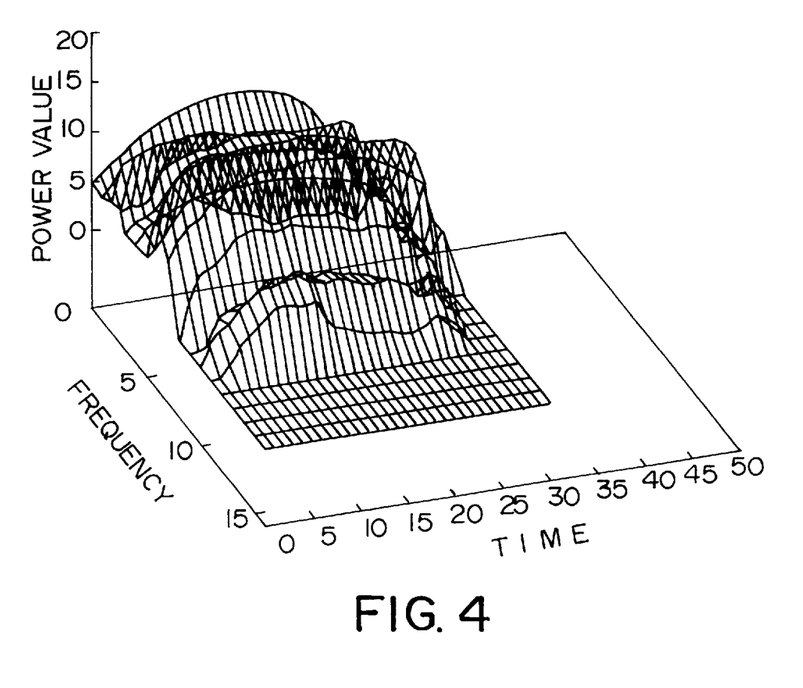
FIG. 4 is a power spectrum diagram showing a vocal sound /a/ in the auditory sense frequencies.
Figure 5:
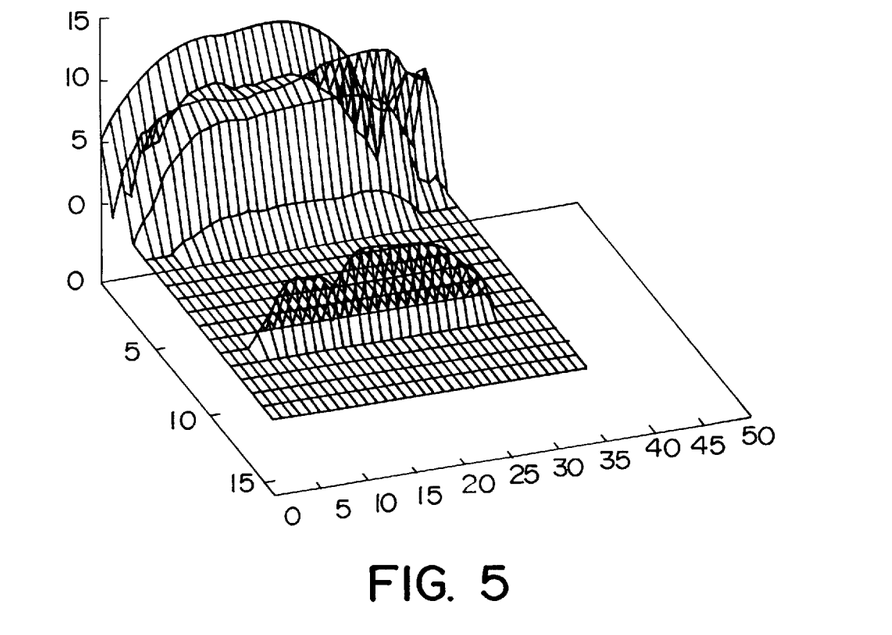
FIG. 5 is a power spectrum diagram showing a vocal sound /i/ in the auditory sense frequencies.
Figure 6:
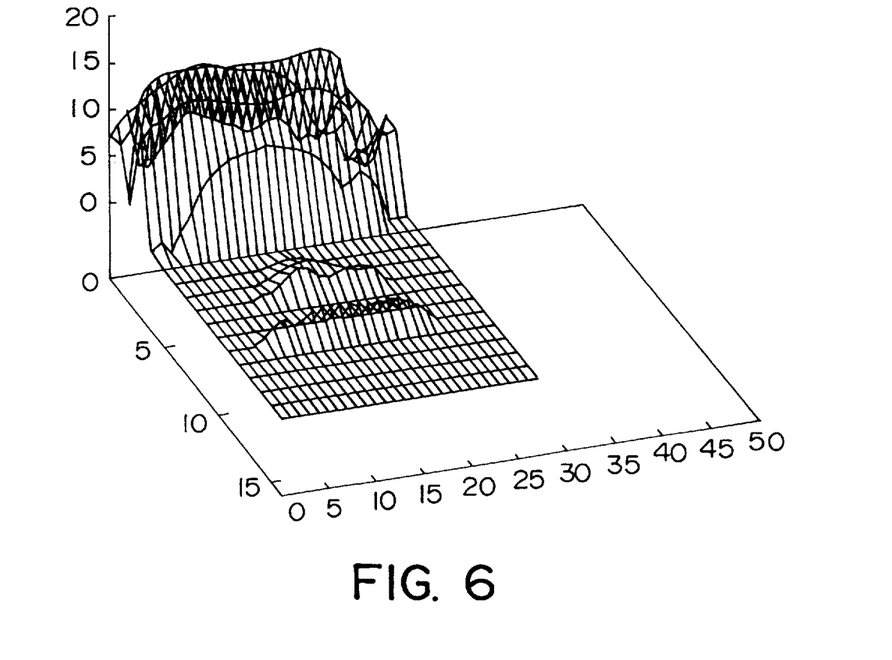
FIG. 6 is a power spectrum diagram showing a vocal sound /u/ in the auditory sense frequencies.
Figure 7:
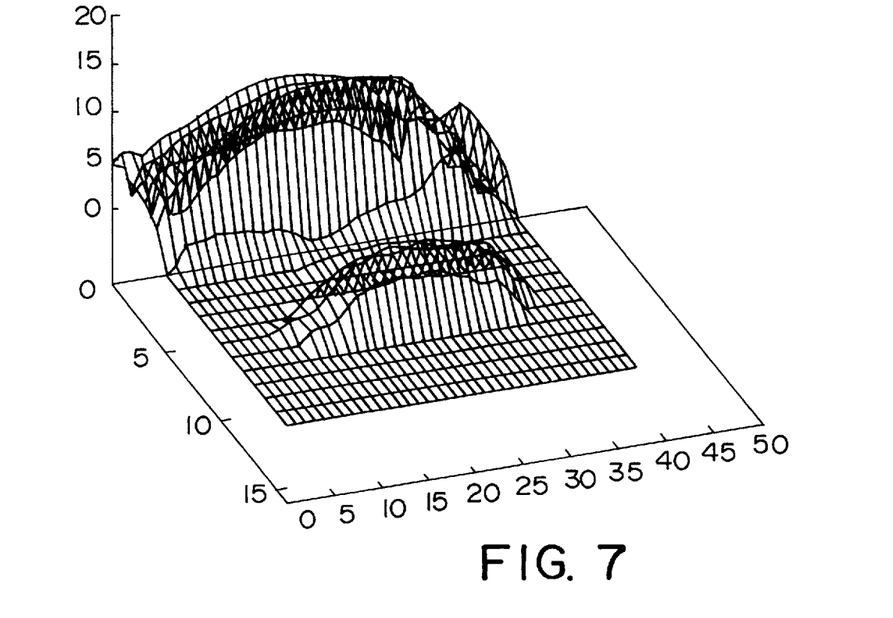
FIG. 7 is a power spectrum diagram showing a vocal sound /e/ in the auditory sense frequencies.
Figure 8:
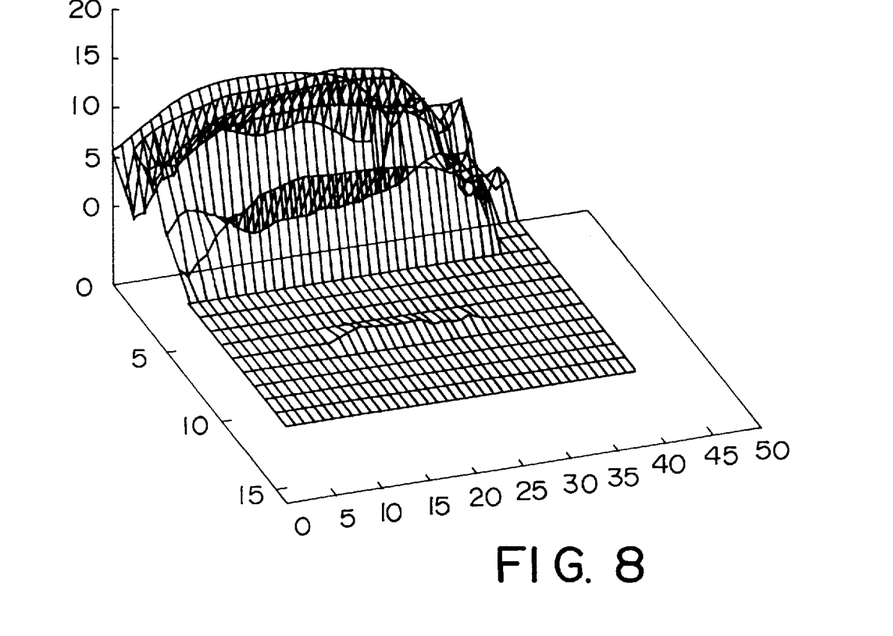
FIG. 8 is a power spectrum diagram showing a vocal sound /o/ in the auditory sense frequencies.

In this case, the frequency resolution of the human auditory sense is lowered in a high frequency band as shown in FIG. 3. The abscissa is represented by a logarithmic scale in FIG. 3, the change rate in pitch thus decreases according to the change rate in frequency in high band. The vocal sound data are thus divided into such blocks as to be widened with increasing frequency in a logarithmic ratio. Further, the power data of the divided blocks are averaged per block, and then transformed into logarithmic values.

Further, in the data processed by the FFT 3, components corresponding to each frequency are given in the form of complex number. Then, their absolute values are averaged and transformed into logarithmic values.

In practice, the sub-band divider 3 executes frequency division as follows;

For instance, when the vocal sounds of vowels (i.e., phonemes) of /a/, /i/, /u/, /e/, and /o/ are orthogonal-transformed in accordance with the FFT method, it is possible to obtain peculiar power spectrum patterns as shown in FIGS. 4 to 8, respectively. In each drawing, power values are denoted in the vertical axis in logarithmic scale and are cut off at a threshold level of 20 dB. Here, the power values are obtained as logarithmic values as follows: the power spectrum is divided into 17 frequency bands in accordance with the blocking described above; the divided spectrum is averaged per sub-band; and the averaged spectrum value is converted into a logarithmic value.

Further, although not shown, in the case of the vocal sounds of consonants, it is also possible to obtain a peculiar power spectrum pattern per consonant. Further, when a plurality of vocal sounds are included, it is possible to obtain a plurality of power spectrum patterns in a synthesized form.

Further, the sub-band divider 4 forms sub-banded power spectrum data by setting the number of the divided frequency bands to 17 and by setting the number of sampled data per block in accordance with the curve shown in FIG. 3.

Figure 9:
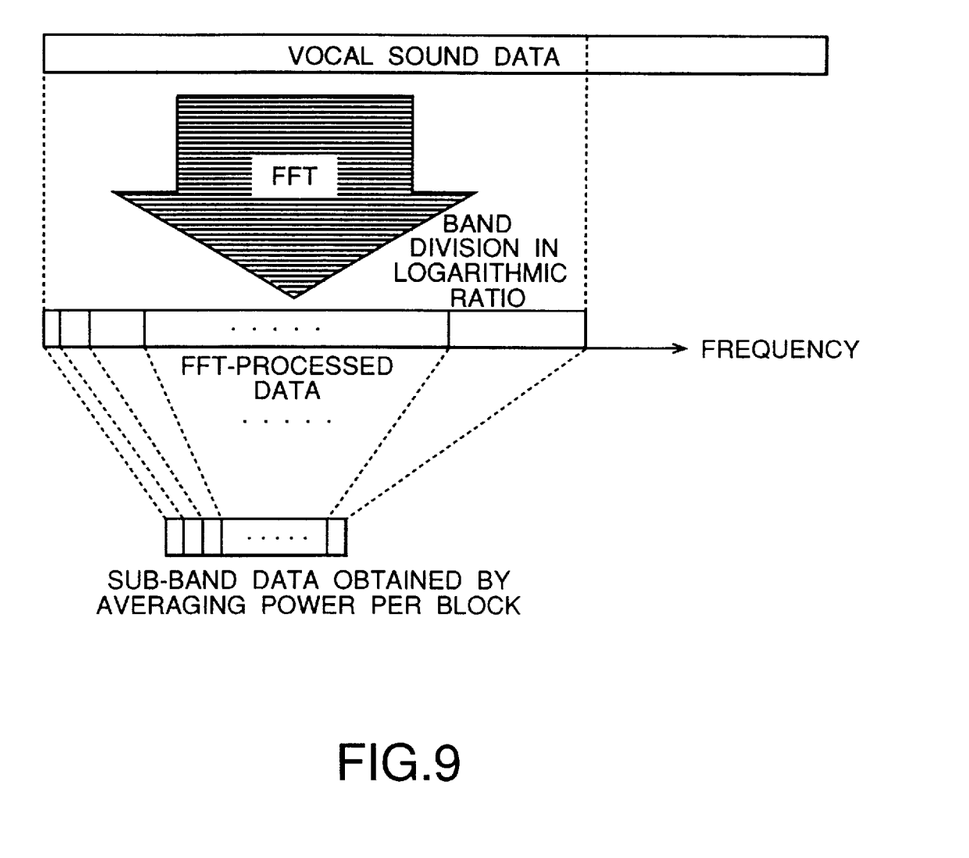
FIG. 9 is an illustration for assistance in explaining data relationship among sequential vocal sound data inputted to the coding apparatus, FFT-processed data, and sub-band data obtained by averaging power spectrum data per block.

Therefore, it is possible to obtain the relationship among the input vocal sound data, the FFT-processed results, and the sub-banded power spectrum data obtained by averaging the power per block (the logarithmic averaged value of the powers per block), as shown in FIG. 9.

Further, the value S obtained in the sub-band in which the averaged power is denoted by E can be given as $$S = \mu[20 * (\log E - 1)]$$

where $\mu(x) = x(x > 0) = 0(\text{else})$

The sub-banded power spectrum data are then sequentially input to a phoneme extracting (P. E.) neural network 5 in FIG. 1.

As shown in FIGS. 4 to 8 by way of examples, the pattern distribution of the power spectrum of the vocal sound data and their change rate on the time axis are peculiar per phoneme. However, it has been clarified that the human auditory sense can distinguish vocal sounds by hearing them on the basis of their pattern data.

Therefore, the phoneme extracting neural network 5 analyzes the power spectrum data sequentially transferred from the sub-band divider 4 to extract the phoneme components included in the vocal sound.

Here, the phoneme extracting neural network 5 will be explained in more detail hereinbelow.

There exist various types of the phoneme extracting neural network 5. In the present embodiment, however, a neural network for executing learning in accordance with three-layer error back propagation (EBP) is adopted.

In general, the neural network is constructed by a circuit obtained by modeling the function of the human nerve cells (neurone), so that the given data patterns cain be stored therein.

Figure 10:
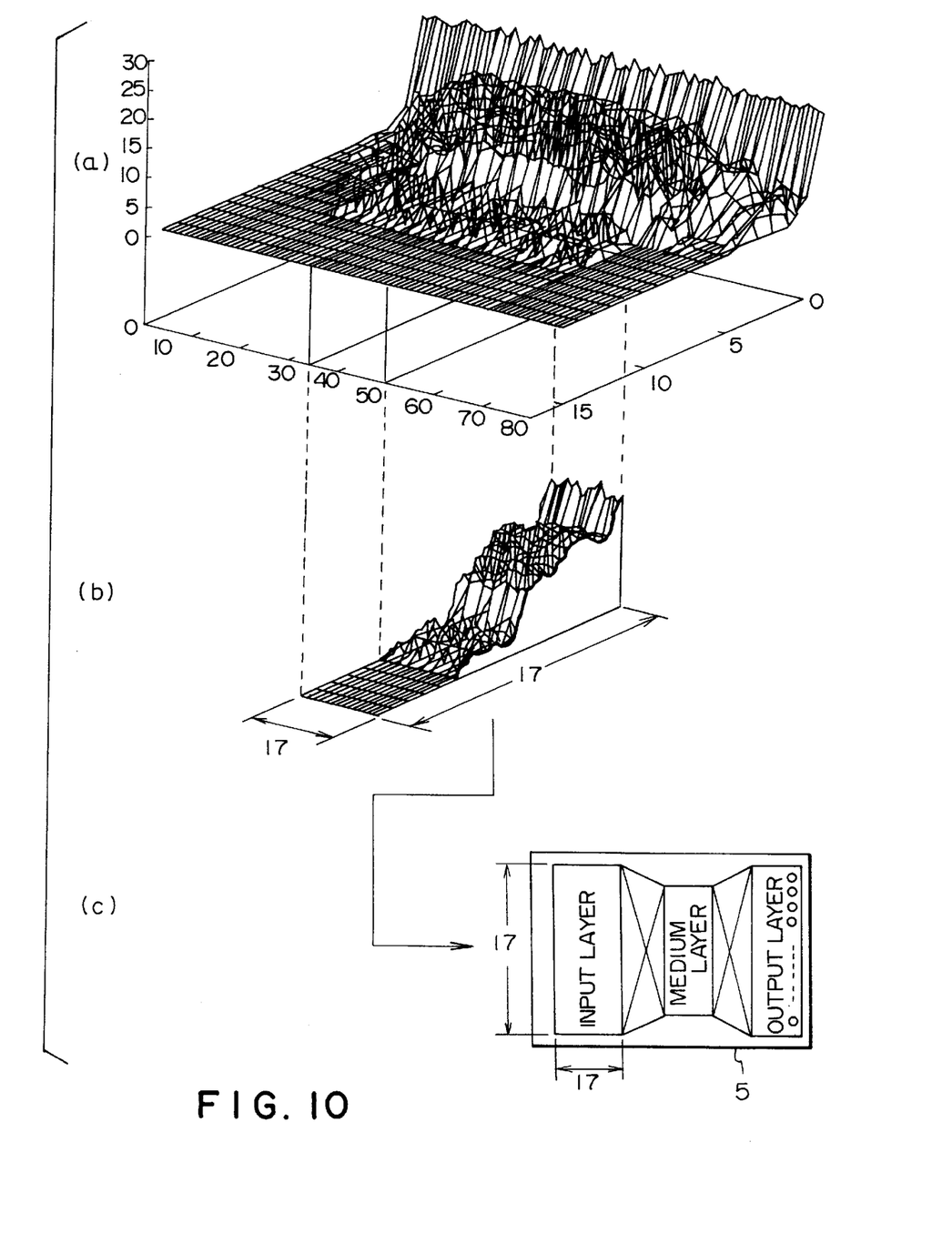
FIG. 10 is a conceptual view showing the learning of the power spectrum data of vocal sound by a phoneme extraction neural network.

For instance, when the power spectrum pattern related to a phoneme as shown in FIG. 10(*a*) is stored, the number of neurone arranged in an input layer of the neuron network 5 is determined as 17×17 (=289) as shown in FIG. 10(*b*). And, the power spectrum data are sequentially input in the time axis direction in unit of a data quantity of (17×17) in corresponding thereto. In this case, the learning is executed by the neural network in such a way that only a specific one of N-units of the neurone arranged in an output layer can react to the input power spectrum data.

Here, in the recognition processing by the neural network, an intermediate layer and the output layer have values Yj as active values. These active values Yj can be calculated in accordance with the following rule as $$Yj = +\Phi(\Sigma Cij * xi)$$

where Xi denotes each active value of the Input neuron i; Cij denotes each coupling weight indicative of the signal transmissibility from the neuron i to the neuron j; and $\Phi(x)$ denotes a monotonous non-decreasing function. Here, $\Phi(x)$ can be given by the above-mentioned $\mu(x)$ or by a sigmoid function as $$\Phi(x) = 1\{1 + \exp(-x)\}.$$

Here, the "learning" implies that when any sub-banded power spectrum data (17 ×17) as shown in FIG. 10(*b*) are input to the input layer of the neural network 5, as shown in FIG. 10(*c*), each coupling weight Cij is set in such a way that only an active value of the specific neuron corresponding to its category in the output layer is activated to [1] and the active values of the other neurons in the output layer are deactivated to [0].

Although it is difficult to obtain the coupling weight Cij as described above analytically, the coupling weight Cij can be obtained approximately in accordance with the EBP method. In this EBP method, the coupling weight Cij is repeatedly updated by variational quantity ACij represented by the following expression:

$$\Delta Cij = K*(Tj - Yj)*Xi$$

where K denotes a learning coefficient; Tj denotes teacher data (a value to be obtained by neuron j). Further, in the coding apparatus according to the present invention, the data patterns related to the vowel phonemes such as /a/, /i/, /u/, /e/, and /o/ as shown in FIGS. 4 to 8 and the consonant phonemes such as /t/, /k/, etc. (not shown) are all input to the phoneme extracting neural network 5, for previous learning, separately.

In FIG. 1, the sub-banded power spectrum data are input from the sub-band divider 4 to the phoneme extracting neuron network 5 for which the learning as described above has previously executed. In the case of the power spectrum data related to a single phoneme as shown in FIGS. 4 to 8, only the output neuron corresponding to the phoneme in the output layer is set to [1] and the other neurone are set to [0].

In this case, however, if the power spectrum date are approximate to the learned data, the active value of the output neuron indicative of the corresponding category designates a value approximate to [1], and the other output neurone designate values approximate to [0].

Further, in the case of the power spectrum data obtained by synthesizing a plurality of vocal sounds, the active values of the respective corresponding output neurone designate values between [1] and [0] on the basis of the power of the phoneme components of the respective vocal sounds. Thus, it is possible to output the data indicative of the phoneme components and the ratios among these phoneme components, on the basis of the active status of each output neuron in the output layer, as correlation data with respect to the learned data.

In more detail, in the pattern matching used in the field of voice recognition, such a method has been adopted that a difference in each phoneme between the input data and the reference data is discriminated and a phoneme having the minimum difference between the two is selected. In the phoneme extracting neuron network 5 according to the present invention, however, the similarity data with respect to the reference data is obtained as the active state of each output neuron, without executing any decisive recognition.

Figure 11:
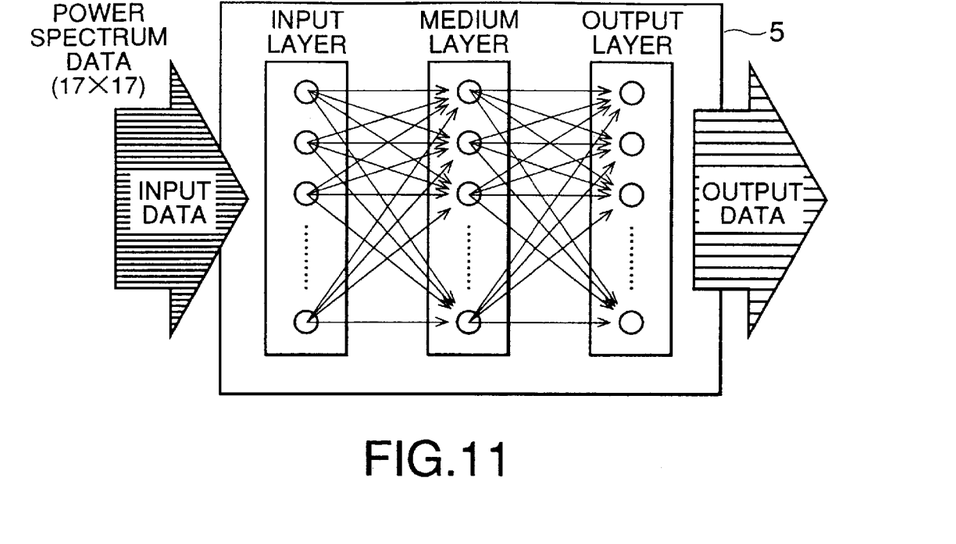
FIG. 11 is a schematic block diagram showing the phoneme extraction neural network.
Figure 12:
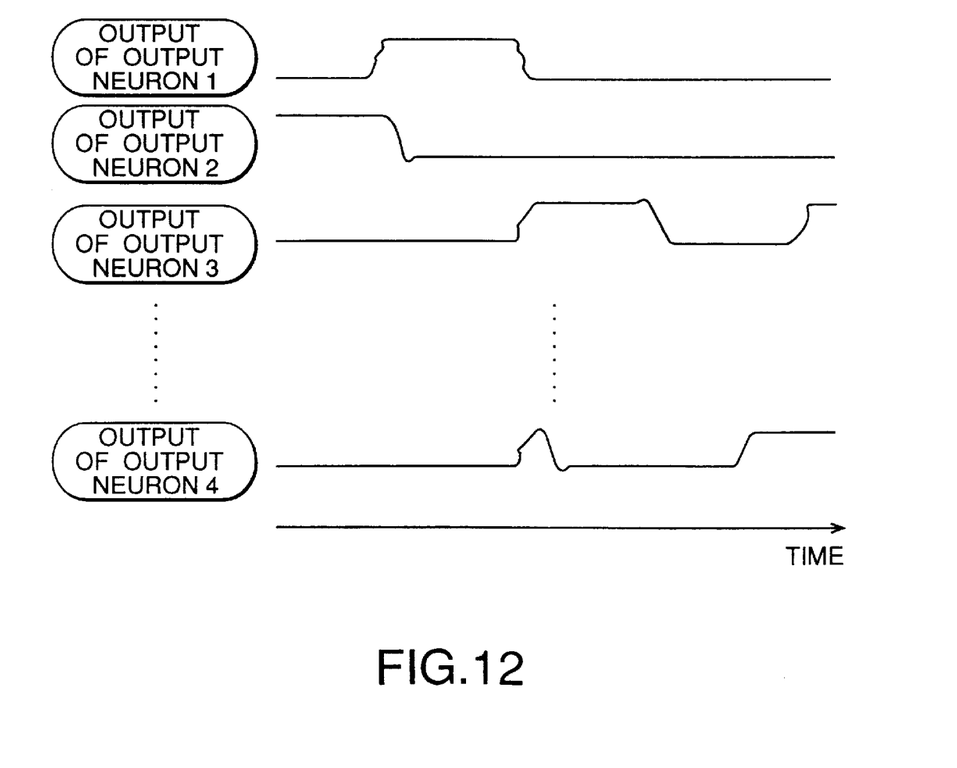
FIG. 12 is a graphical representation showing the reactive output status of each neuron in an output layer of the phoneme extraction neural network.

Therefore, when the sub-banded power spectrum data are sequentially input to the phoneme extracting neuron network 5 in time series in unit of (17 ×17) block as shown in FIG. 11, it is possible to obtain sequential output patterns from each output neurone as shown in FIG. 12. On the basis of the obtained output patterns, it is possible to obtain data as to which time band the inputted vocal sound data belong and at which proportion the phoneme components are included.

When actual vocal sound data are reproduced, pitch data and power data in frequency related to the power spectrum are both necessary in addition to the above-mentioned data. The pitch data can be obtained on the basis of the distribution of the FFT-processed (or sub-banded) power spectrum data. The most simple extracting method is to detect a phoneme having the maximum absolute value from the FFT-process results. Further, the power data can be obtained as the sum of squares of the absolute values of each component on the basis of the sampled data of the sampler 2 or the FFT-processed results.

Accordingly, as shown in FIG. 1, in the present embodiment, the pitch data and the power data are both extracted on the basis of the processing results of the FFT 3 by use of a pitch and power extractor 6 provided with absolute value calculating circuits, integrators, adders and comparators.

As described above, the data related to the phoneme components of vocal sound data can be obtained by the phoneme extracting neuron network 5, and the pitch data and the power data can be obtained by the pitch and power extractor 6. Further, both the extracted data are input to a code generator 7 as shown in FIG. 1.

The code generator 7 reads data of a predetermined number of bits obtained on the basis of the active statue of each output neuron of the phoneme extracting neuron network 5 and the outputs of the pitch and power extractor 6, and outputs a data stream obtained by arranging these read data in a predetermined sequence to a transmission line.

Figure 13:
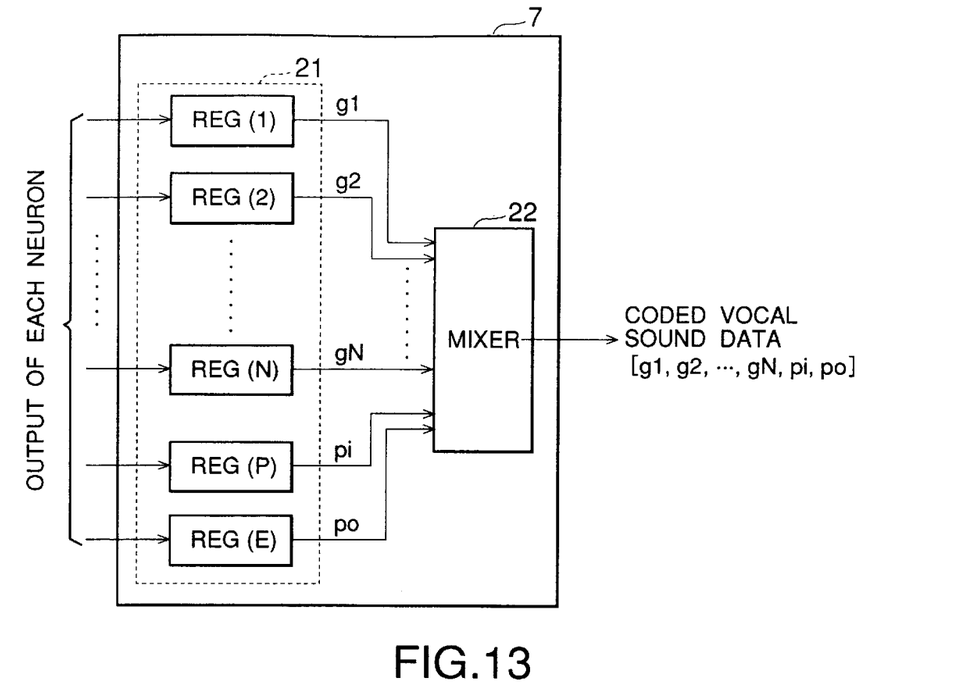
FIG. 13 is a functional circuit block diagram showing a code generator shown in FIG. 1.

FIG. 13 shows the code generator 7 provided with a register 21 and a mixer 22. The register section 21 is made up of a plurality of registers REG(1), REG(2), . . . , REG(N) for holding data g1, g2, . . . , gN of the output neurone of the phoneme extracting neuron network 5, respectively, and two registers REG(P) and REG(E) for holding the pitch data pi and the power data po of the pitch and power extractor 6, respectively. Whenever the data processed at a time by the FFT 3 are held by the register 21, the mixer 21 reads the data from each register of the register 21, and forms a data stream of [g1, g2, . . . , gN, pi, po]. The formed data stream is transmitted to the transmission line, as already explained.

Therefore, the data of unit stream indicate the status of the vocal sound data in the time band corresponding to the data processed by the FFT 3 at a time.

Here, the data compression ratio will be discussed hereinbelow.

Here, the assumption is made that the number of the neurone of the output layer of the phoneme extracting neuron network 5 is 25; and the vocal sound data, the pitch data and the power data are all sampled by 8 bits.

Now, when the original data quantity processed at a time by the FFT 3 is 4096 (=256*16) bits and the shift rate in the time direction of the data input to the phoneme extracting neuron network 5 is 1, the coded data quantity FFT-processed at a time is 216 (=25*8+8+8) bits, with the result that the compression ratio is about 1/9.

When the shift rate in the time direction is 8, the coded data quantity FFT-processed at a time is 27 (=(25*8+8+8) / 8) bits, with the result that the compression ratio is about 1/150.

It is possible to further increase the compression ratio with the high efficiency coding method based upon the differential data or Huffman coding utilizing the strong time-serial correlation In the output data obtained by the respective neurone of the output layer of the phoneme extracting neuron network 5.

As described above, in the embodiment of the coding apparatus according to the present invention, the vocal sound data are compressed by use of the sub-band divider 4 and the phoneme extracting neuron network 5.

Without being limited to only the above-mentioned sub-banding method, it is possible to adopt another method as the data converting methods of using the phoneme feature on the basis of the FFT-processed power spectrum data.

For example, data are input to the phoneme extracting neuron network 5 after formant (data indicative of the concentrated portion of the spectrum) or CEPSTRUM (data indicative of the envelop line of the spectrum) has been obtained. In this case, after the phoneme extracting neuron network 5 has previously learned the formant or CEPSTRUM data corresponding to each phoneme, each output neurone are allowed to react on the basis of the correlation with respect to the transformed data input thereto, in the same way as with the case of the above-mentioned embodiment.

Figure 14:
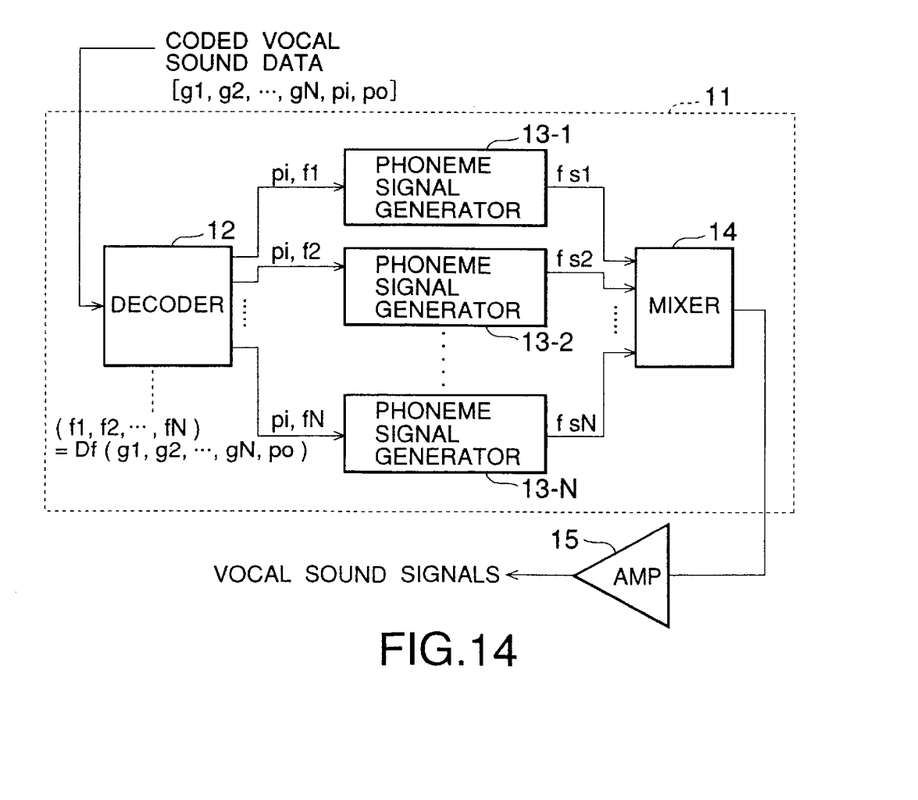
FIG. 14 is a circuit block diagram showing an embodiment of the vocal sound data decoding apparatus according to the present invention.

Next, FIG. 14 shows a block diagram showing a decoding apparatus 11 corresponding to the coding apparatus shown in FIG. 1.

As already explained, the data coded by the coding apparatus shown in FIG. 1 are composed of the phoneme component data (g1, g2, . . . , gN) obtained by the phoneme extracting neuron network 5 and the pitch data (pi) and the power data (po) obtained by the pitch and power extractor 6. When these data are input to the decoding apparatus 11, a decoder 12 resolves the respective data. Further, the decoder 12 obtains drive control data f1, f2, . . . , fN applied to a plurality of phoneme signal generators 13-1, 13-2, . . . , 13-N of the succeeding stage in accordance with a previously given function as follows:

$$(f1, f2, \ldots, fN) = Df(g1, g2, \ldots, gN, po)$$

Here, in general, the function Df is a function for obtaining an N-order vector on the basis of an (N+1)-order vector.

As a practical example, it is possible to assume that a linear mapping from (g1, g2, . . . , gN) to (f1, f2, . . . , fN) can be obtained as (f1, f2, . . . , fN)=(po, g1, po, g2, . . . , po, gN).

Therefore, the obtained f1, f2, . . . , fN indicate the component quantities of each phoneme included in the vocal sound within the afore-mentioned constant time bands.

The data f1, f2, . . . , fN obtained by the decoder 12 and the transmitted pitch data are transferred to the corresponding phoneme signal generators 13-1 to 13-N, respectively. In other words, when j is 1, 2, . . . , N, data [fj, pi] are transferred to the phoneme signal generator 13-j on the basis of the data arrangement order. When the phoneme component quantity fj and the pitch data pi are given, each phoneme signal generator 13-j generates the phoneme signal fsj corresponding to the j-th phoneme.

In the decoding apparatus according to the present invention, since the phoneme signal generators 13-1 to 13-N related to each phoneme used in Japanese language are provided. Therefore, when the phoneme component quantity and the pitch data pi are inputted from the decoder 12, the phoneme signal generators 13-1 to 13-N can generate respective phoneme signals fs1, fs2, . . . , fsN within the constant time band, separately.

The outputs of the phoneme signal generators 13-1 to 13-N are mixed with each other by a mixer 14; that is, the phoneme signals fs1, fs2, . . . , fsN are synthesized by the mixer 14, so that it is possible to reproduce the original vocal sound signals. The reproduced signals are amplified by an amplifier 15 and then output as vocal sound through a speaker (not shown).

In the embodiment, the phoneme signal generators 13-1 to 13-N generate the respective phoneme signals as analog signals. However, it is of course possible to output digital phoneme signals. In this case, the mixer 14 is replaced with a code generator, and the generated digital signals can be stored in a digital recording medium.

As described above, according to the present invention, digitized vocal sound data are orthogonal-transformed; the features of the vocal sound data are extracted by use of the power spectrum data on the basis of reference phonemes; and the extracted data are coded. It is thus possible to code the vocal sound data in a high efficiency, as compared with the conventional coding method. It is possible to achieve a high efficiency transmission of vocal sound data and to reduce the capacity of the storage medium markedly.

Further, the output neurone corresponding to each phoneme are activated by use of the neural network obtained by modeling the human auditory sense nerve system as the phoneme extracting means. It is thus possible to achieve a programmable coding apparatus suitable for the human auditory sense characteristics.

Further, the power spectrum data are divided into frequency bands under consideration of the human auditory sense characteristics and the neural network can extract the phoneme components in unit of block data. It is thus possible to achieve high-efficiency coding which can cope with fine differences in sound quality.

Further, it is possible to achieve the decoding apparatus for reproducing the high quality vocal sound in correspondence to the coding method of the coding apparatus according to the present invention.

What is claimed is:

1. An apparatus for coding vocal sound data signals, comprising:

transforming means for orthogonal-transforming sequential input digital vocal sound data signals per predetermined number of the data signals to obtain power spectrum data signals;

converting means for converting the power spectrum data signals into a data conversion form that features corresponding to phonemes of the vocal sound data signals are extracted;

comparing means for comparing converted data signals from the converting means with reference data pattern signals related to the features corresponding to the data conversion form to obtain correlation data signals between the converted data signals and the reference data pattern signals;

first extracting means for extracting pitch signals in a frequency direction on the basis of the power spectrum data signals or the converted data signals;

second extracting means for extracting power value signals on the basis of the vocal sound data signals or the power spectrum data signals; and coding means for sequentially coding the correlation data signals, pitch signals, and power value signals, and outputting sequential coded vocal sound data signals.

2. The apparatus according to claim 1, wherein the converting means divides the power spectrum data signals into blocks by frequency bands widened with increasing frequency in logarithmic ratio.

3. The apparatus according to claim 1, wherein the comparing means includes a neural network to which learning of the reference data pattern signals has been already executed per phoneme, the neural network having at least one output neuron corresponding to each phoneme, the output neuron being reactive on the basis of correlation between the converted data signals and the learned reference data pattern signals.

4. The apparatus according to claim 1, wherein the coding means comprises:

registers for holding the correlation data signals, pitch signals, and power value signals, respectively; and a mixer for mixing the held correlation data signals, pitch signals, and power value signals with each other to form a coded data stream.

5. An apparatus for decoding vocal sound data signals, comprising:

decoding means for decoding coded data signals formed at least with pitch signals, and power value signals per phoneme related to vocal sound, the coded data signals being formed by orthogonal-transforming sequential digital vocal sound data signals per predetermined number of the data signals to obtain power spectrum data signals, converting the power spectrum data signals into a data conversion form that features corresponding to phonemes of the vocal sound data signals are extracted, comparing the converted data signals with reference data pattern signals related to the features corresponding to the data conversion form to obtain correlation data signals between the converted data signals and the reference data pattern signals, extracting the pitch signals in a frequency direction on the basis of the power spectrum data signals or the converted data signals, extracting the power value signals on the basis of the vocal sound data signals or the power spectrum data signals and sequentially coding the correlation data signals, pitch signals, and power value signals;

signal forming means for forming signals related to each phoneme on the basis of the power value signals and pitch signals decoded by the decoding means; and synthesizing means for synthesizing the formed signals with each other to reproduce vocal sound signals.

6. A method for coding vocal sound data signals, comprising the steps of:

orthogonal-transforming sequential input digital vocal sound data signals per predetermined number of the data signals to obtain power spectrum data signals;

converting the power spectrum data signals into a data conversion form that features corresponding to phonemes of the vocal sound data signals are extracted;

comparing converted data signals thus converted into the data conversion form with reference data pattern signals related to the features corresponding to the data conversion form to obtain correlation data signals between the converted data signals and the reference data pattern signals;

extracting pitch signals in a frequency direction on the basis of the power spectrum data signals or the converted data signals;

extracting power value signals on the basis of the vocal sound data signals or the power spectrum data signals; and sequentially coding the correlation data signals, pitch signals, and power value signals, and outputting sequential coded vocal sound data signals.

7. The method according to claim 6, wherein the converting step includes the step of dividing the power spectrum data signals into blocks by frequency bands widened with increasing frequency in logarithmic ratio.

8. The method according to claim 7, wherein the comparing step includes the steps of:

learning the reference data pattern signals per phoneme and per frequency band; and discriminating the correlation between the converted data signals and the learned reference data pattern signals per frequency band.

9. The method according to claim 6, wherein the pitch signal extracting step includes the steps of detecting a phoneme having a maximum absolute value from the converted data signals.

10. The method according to claim 6, wherein the power value signal extracting step includes the steps of obtaining a sum of squares of absolute values of the digital vocal sound data signals.

11. The method according to claim 6, wherein the power value signal extracting step includes the steps of obtaining a sum of squares of absolute values of the converted data signals.

12. A method for decoding vocal sound data signals, comprising the steps of:

decoding coded data signals formed at least with pitch signals, and power value signals per phoneme related to vocal sound, the coded data signals being formed by orthogonal-transforming sequential digital vocal sound data signals per predetermined number of the data signals to obtain power spectrum data signals, converting the power spectrum data signals into a data conversion form that features corresponding to phonemes of the vocal sound data signals are extracted, comparing the converted data signals with reference data pattern signals related to the features corresponding to the data conversion form to obtain correlation data signals between the converted data signals and the reference data pattern signals, extracting the pitch signals in a frequency direction on the basis of the power spectrum data signals or the converted data signals, extracting the power value signals on the basis of the vocal sound data signals or the power spectrum data signals and sequentially coding the correlation data signals, pitch signals, and power value signals;

forming signals related to each phoneme on the basis of the power value signals and pitch signals decoded by the decoding step; and synthesizing the formed signals with each other to reproduce vocal sound signals.

\* \* \* \* \*